March 10, 1959 R. W. KLING 2,876,918
EJECTOR TYPE LOAD HAULING VEHICLE
Filed May 9, 1957 7 Sheets-Sheet 1
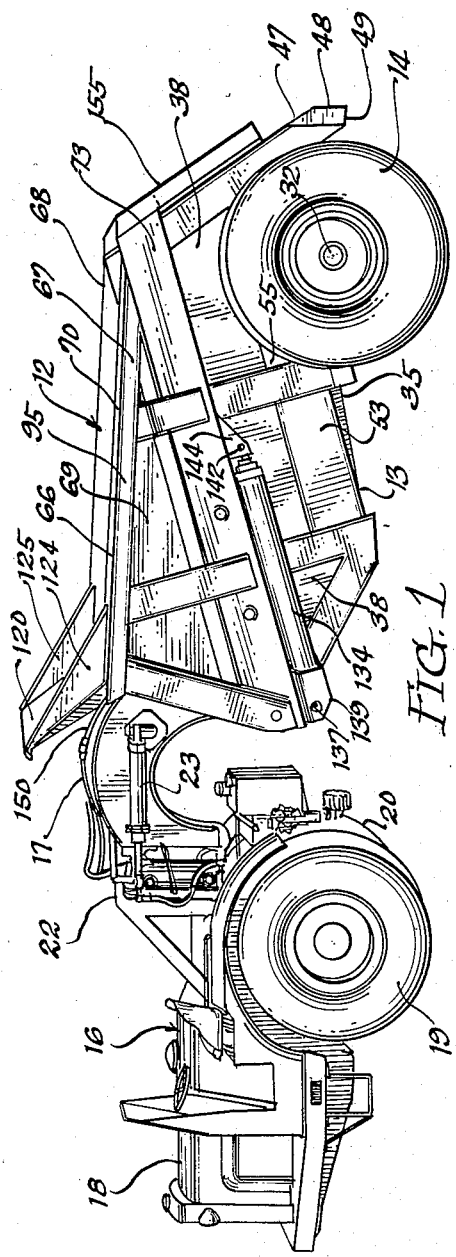
INVENTOR.
Robert W. Kling
BY
Horton, Davis, Brewer and Bregman
Attorneys March 10, 1959  R. W. KLING  2,876,918
EJECTOR TYPE LOAD HAULING VEHICLE
Filed May 9, 1957  7 Sheets-Sheet 2

INVENTOR.
Robert W. Kling
BY
Horton, Davis, Brewer & Brugman
Attorneys

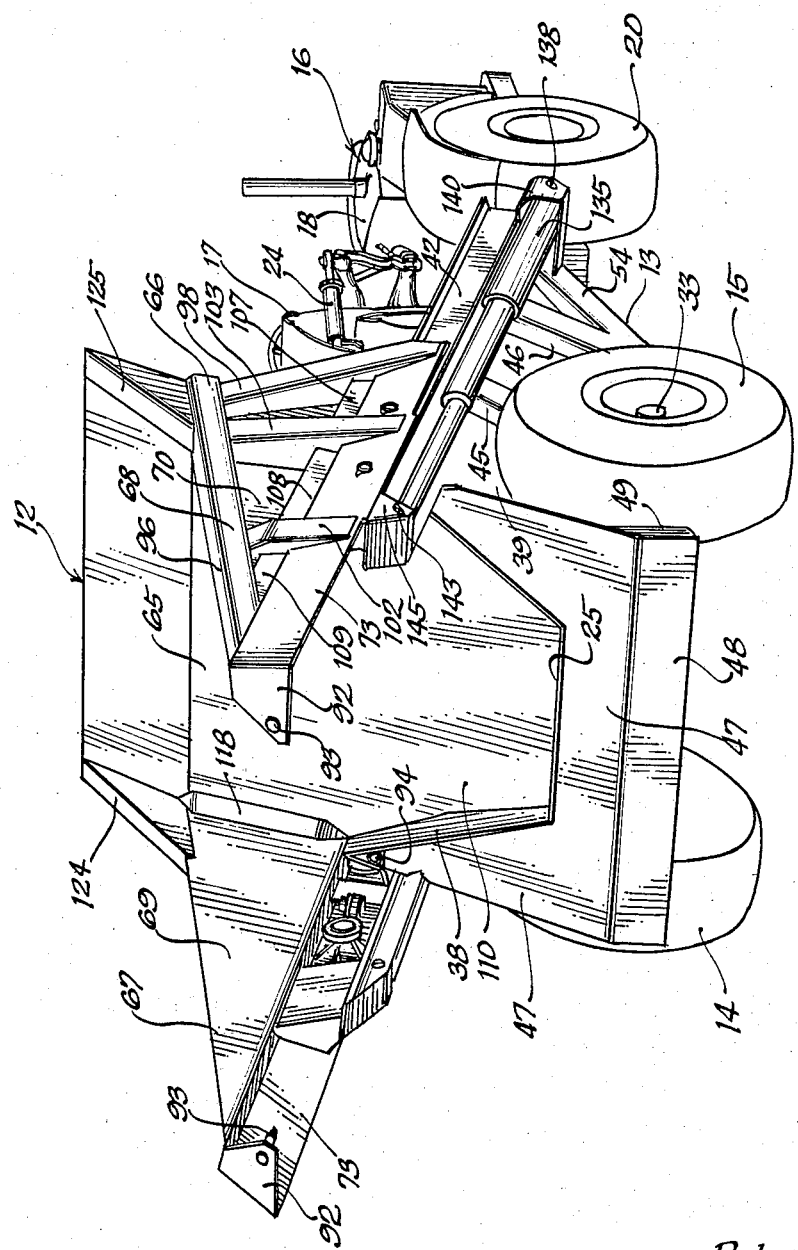

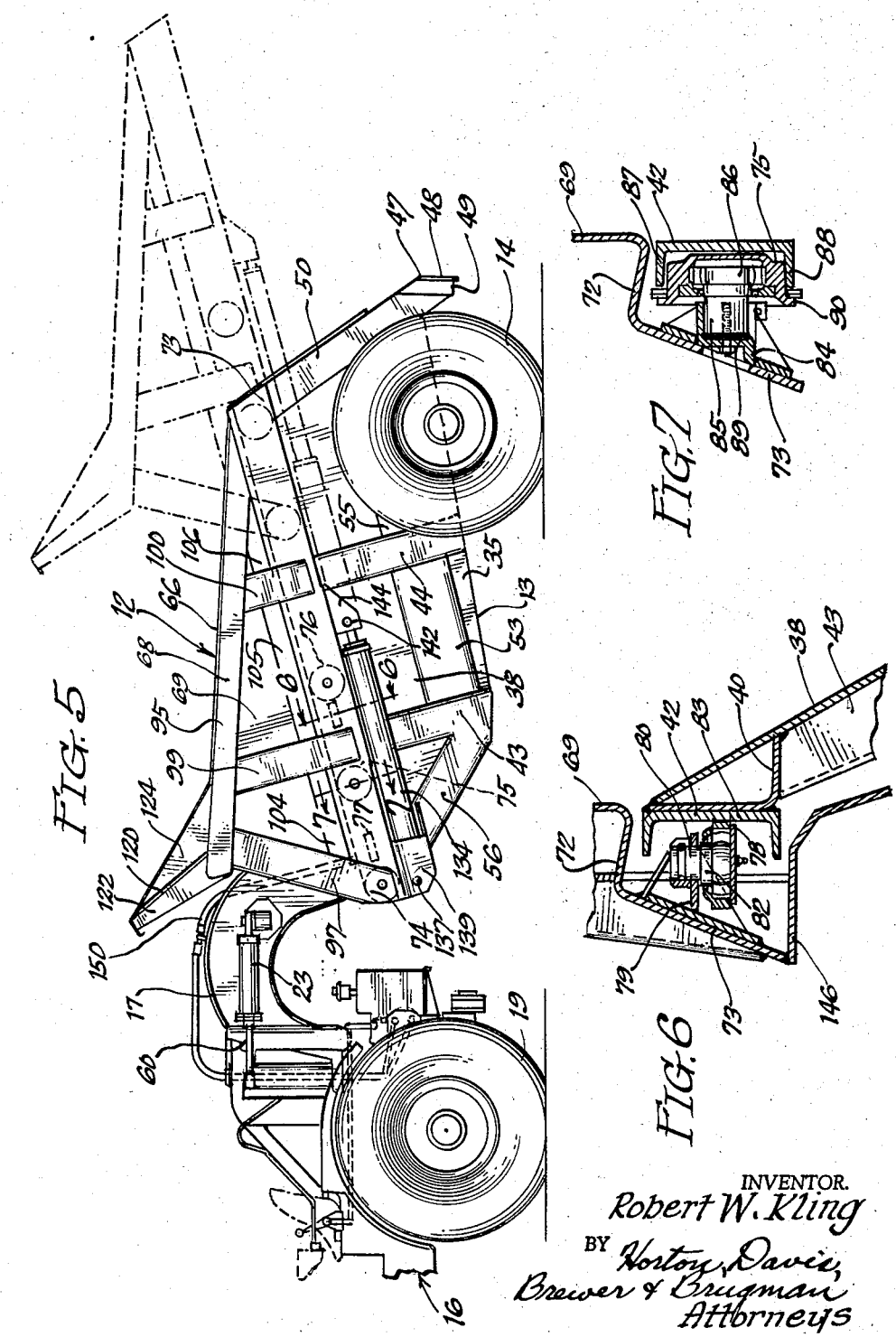

March 10, 1959     R. W. KLING     2,876,918
EJECTOR TYPE LOAD HAULING VEHICLE
Filed May 9, 1957     7 Sheets-Sheet 5
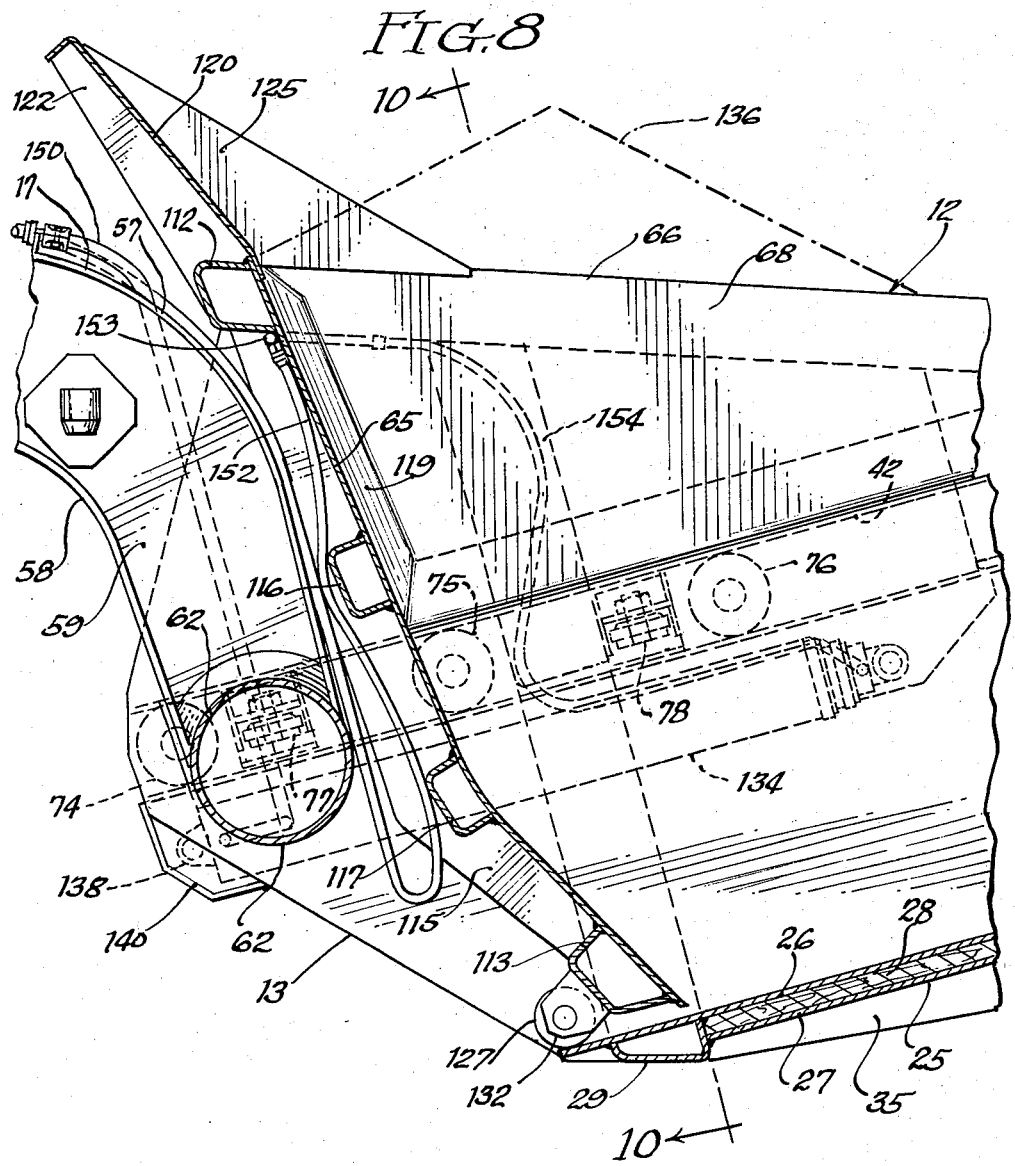
INVENTOR.
Robert W. Kling
BY
Horton, Davis, Brewer & Brugman
Attorneys

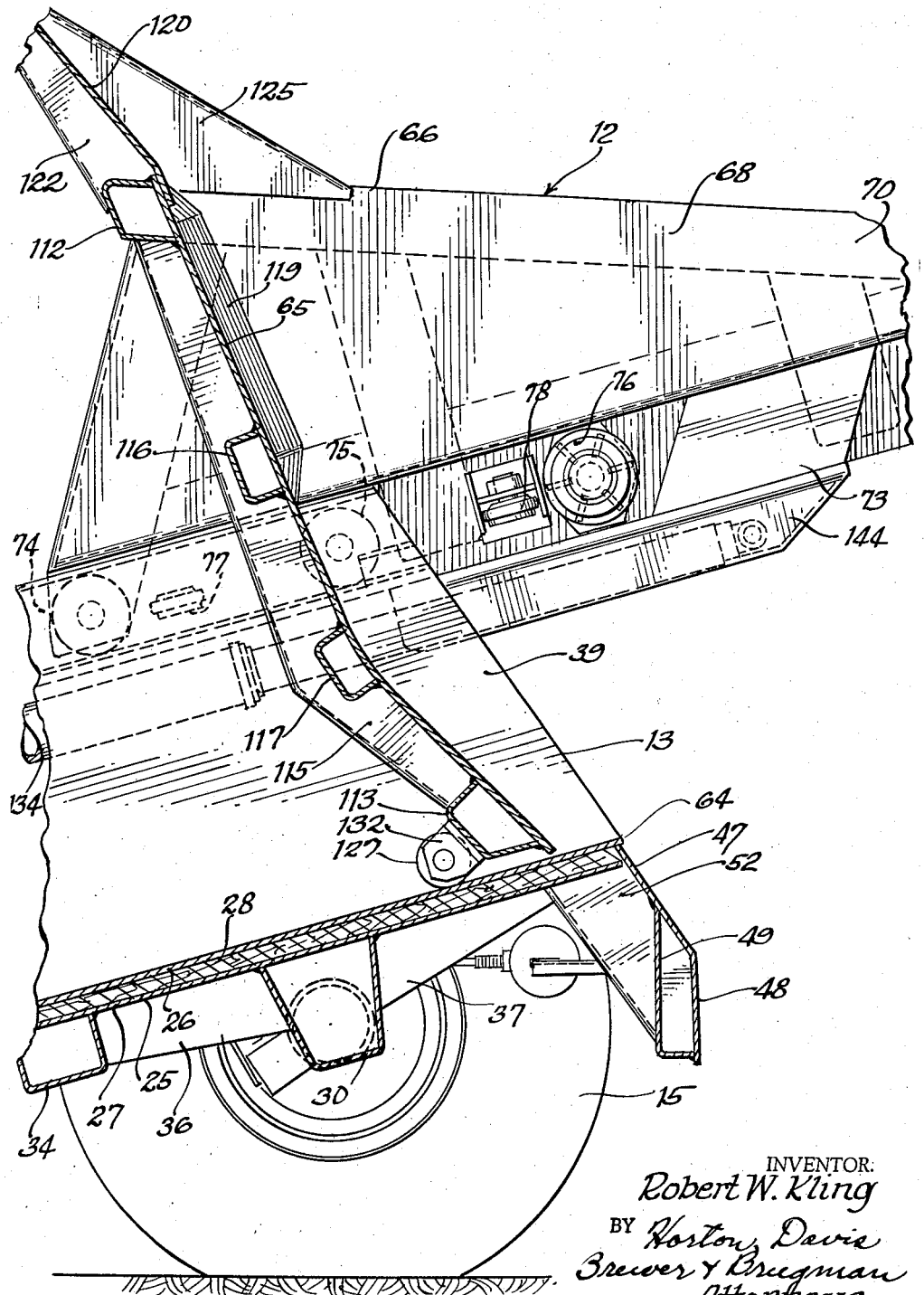

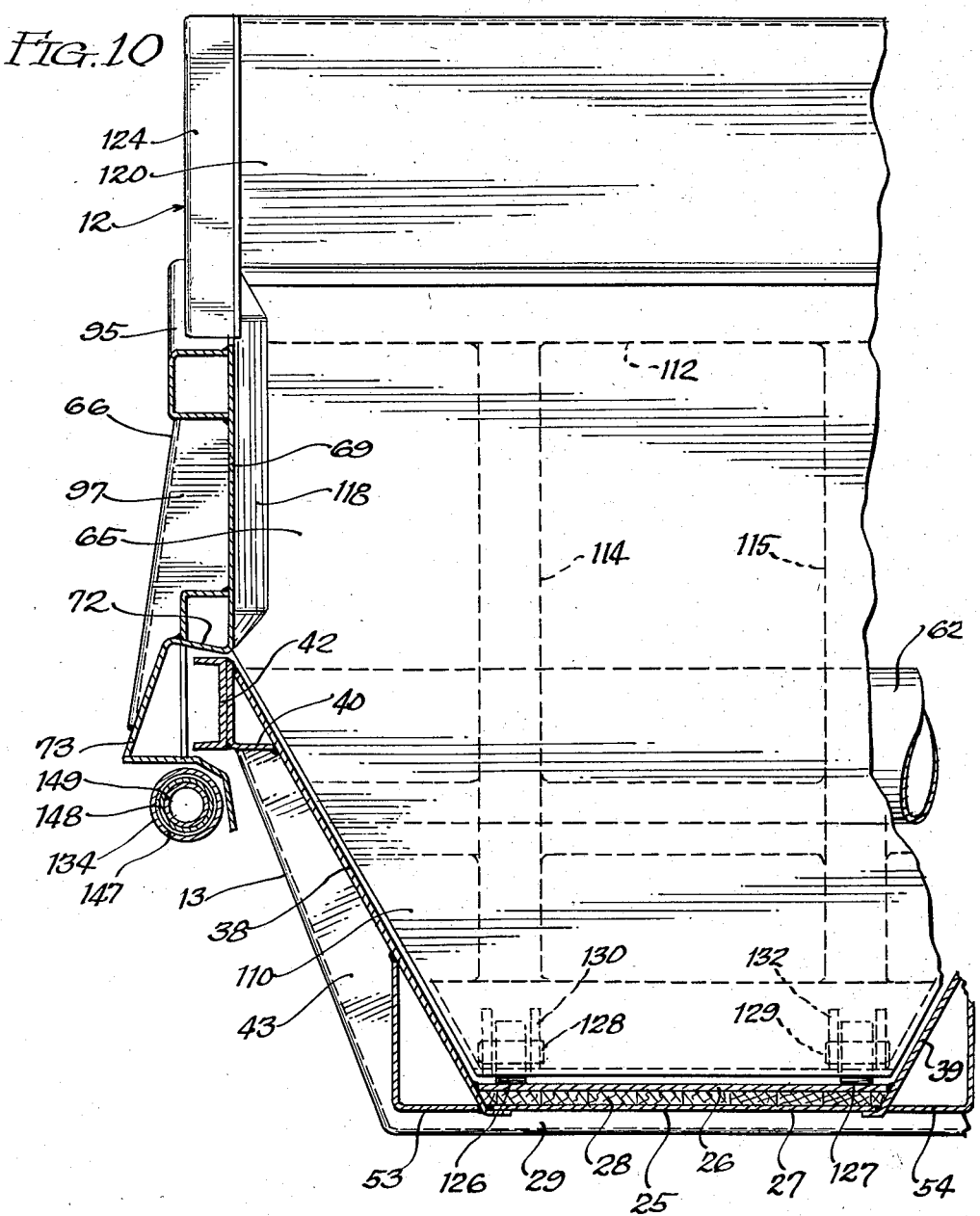

United States Patent Office 2,876,918
Patented Mar. 10, 1959

2,876,918
EJECTOR TYPE LOAD HAULING VEHICLE

Robert W. Kling, Wilmette, Ill., assignor to Athey Products Corporation, Chicago, Ill., a corporation of Illinois Application May 9, 1957, Serial No. 658,110

5 Claims. (Cl. 214—82)

This invention relates to load hauling vehicles, and more particularly to such vehicles having means movable from the front to the rear of a load hauling body for ejecting the body contents from the rear end thereof.

One of the general objects of this invention is to provide an ejector type vehicle having large load hauling capacity, relatively low loading height and a relatively low center of gravity when loaded.

Another object of the invention is to provide an ejector type load hauling vehicle in which the bottom of the body slopes downwardly toward the front from a relatively high rear discharge lip.

As another object, my invention comprehends an ejector type load hauling vehicle having a rear skirt which extends downwardly from the lip over which material is discharged and provides an element for casting and pushing material, as well as serving purposes such as a rear fender and tire shield.

My invention also has within its purview the provision of an ejector type load hauling vehicle embodying an ejector plate which is actuated directly by hydraulic means, and wherein the action line of the hydraulic means is close to the axis of load resistance during ejection of material from the body.

It is another object of the invention to provide an ejector type load hauling vehicle having an ejector assembly including an ejector plate movable on rail and roller means, and wherein the rails of said means extend along opposite sides of the assembly to positions ahead of the ejector plate.

This invention further has within its purview the provision of an ejector type load hauling vehicle wherein the ejector assembly is supported for movement longitudinally of the body by horizontally and vertically mounted rollers which are movable along protected tracks and adjustable.

In the structure of this invention, I have provided an ejector type load hauling vehicle wherein the ejector assembly includes side and front walls of substantial size extending upwardly from the lower portion of the body and is provided with means for locking the rear ends of the ejector assembly side walls in aligned relationship to those of the lower portion of the body during hauling and loading, in order to prevent the ejector assembly side walls from becoming twisted, warped or spread in use.

I have further provided an ejector type load hauling vehicle having an ejector assembly adapted to carry a tail gate closing the rear end of the body for hauling and movable with the ejector assembly to open the rear end of the body during ejection of the load.

Other objects and advantages of the invention will be apparent from the following description and the accompanying drawings in which similar characters of reference indicate similar parts throughout the several views.

Referring to the drawings of which there are seven sheets:

Fig. 1 is a side elevational view of an ejector type load hauling vehicle embodying one form of this invention and wherein the illustrative vehicle shown is of the trailer type and is depicted in a normal load hauling position and attached to a two-wheel tractor for motivation;

Fig. 2 is also a side elevational view of the ejector type load hauling vehicle shown in Fig. 1, but depicts the vehicle in a load ejecting position and the tractor is indicated in outline by dot-and-dash lines;

Figs. 3 and 4 are perspective views taken from the rear and somewhat to one side of the ejector type load hauling vehicle shown in Figs. 1 and 2, with the tractor attached, Fig. 3 showing the normal load hauling position corresponding to Fig. 1, and Fig. 4 illustrating the load ejecting position corresponding to the illustration of Fig. 2;

Fig. 5 is a further side elevational view of the load hauling vehicle with the tractor shown fragmentarily and wherein the normal load hauling position is illustrated in solid lines, while the load ejecting position is indicated in dotted lines;

Figure 3:
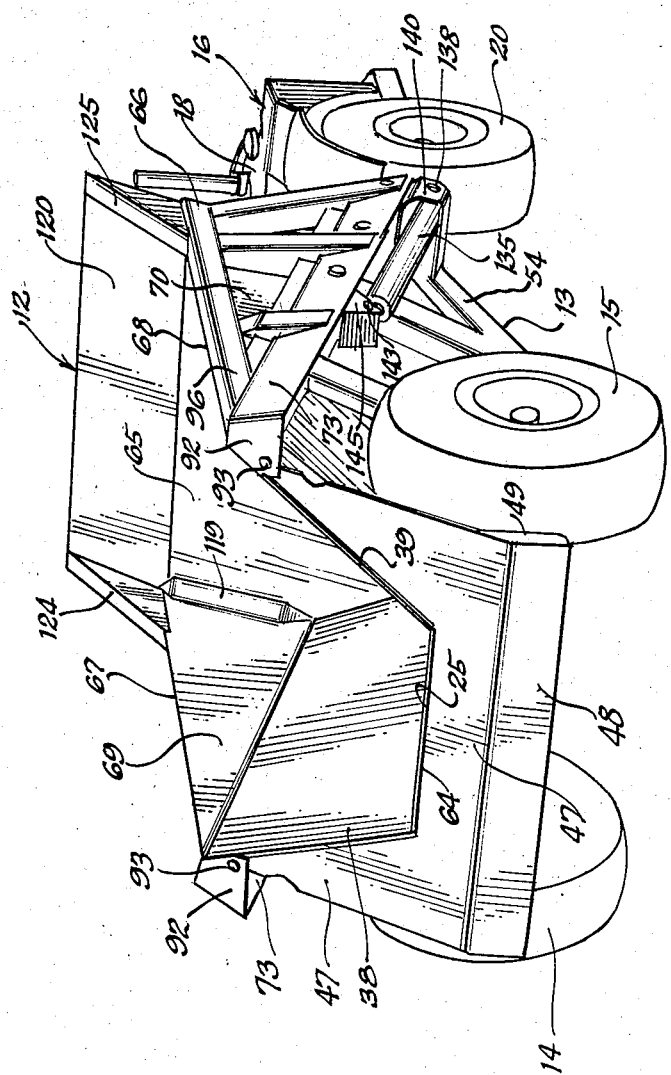

Figs. 6 and 7 are respectively fragmentary end sectional views of details of the structure and taken substantially on lines 6—6 and 7—7 of Fig. 5, in the directions indicated by arrows;

Figs. 8 and 9 are longitudinal sectional views taken at opposite end portions of the vehicle, and wherein Fig. 8 depicts the parts in their normal load hauling positions, while Fig. 9 shows the positions of some of the same parts of the vehicle when moved to the load ejecting position; and Fig. 10 is a fragmentary end sectional view taken substantially as indicated by line 10—10 and accompanying arrows in Fig. 8.

Considered generally, the exemplary embodiment of my invention which is herein shown for illustrative purposes is a load hauling vehicle of the trailer type wherein a trailer 12 has a load hauling body 13 supported at the rear by wheels 14 and 15 and having its front end supported and connected to a tractor 16 through a gooseneck type of supporting and connecting structure 17. In the illustrative adaptation herein depicted, the tractor 16 is of the two-wheel type having a prime mover enclosed within a housing 18 at the front end thereof and driving wheels 19 and 20 near the rear end thereof. As is usual in tractor drawn vehicles, the tractor 16 is connected to the gooseneck supporting and connecting structure 17 through a coupling structure 22 embodying swivel connections which provide for rocking, tilting and turning movements of the tractor relative to the trailer in operation. In this instance, steering of the vehicle is effected through the operation of rams 23 and 24 on opposite sides of the gooseneck structure and extending angularly between that structure and the coupling structure 22; the tractor being provided with means affording a supply of fluid under pressure for the actuation of the rams 23 and 24 and other hydraulically operated parts of the vehicle.

In the structure herein depicted, the body 13 of the trailer 12 has a bottom 25 which, as shown in Figs. 8, 9 and 10, embodies metal plates 26 and 27 in spaced and substantially parallel relationship to one another and separated by longitudinally extending filler boards 28. At the front, the bottom is laterally rigidified by a cross member 29 of channel section (Fig. 8) secured by welding to the plates 26 and 27. Near the rear, as shown in Fig. 9, a relatively heavy and deep channel 30 extends across the bottom and is secured by welding to the plate 27 and serves not only to provide lateral rigidity to the body bottom but also to support stub axles 32 and 33 at its opposite ends, upon which axles the wheels 14 and 15 respectively are mounted for rotation. Intermediate the cross member 29 and channel 30, an additional reenforcing channel 34 extends across the bottom of the body and is secured by welding to the plate 27.

Longitudinal reenforcement of the body bottom is provided by laterally spaced channels such as 35 which are secured at their ends to the cross member 29 and the channel 34 and intermediate their ends to the plate 27, as by welding. Similarly, longitudinally extending and laterally spaced channels such as 36 and 37 extend forwardly and rearwardly from the channel 30, these channels each being secured by welding at their ends to the channel 30 and also to the plate 27. The channels 36 are also secured at the ends opposite the channel 30 to the cross channel 34.

At the opposite sides of the body bottom 25, side walls are provided by plates 38 and 39 secured along their lower margins to the bottom plates 26 and 27 and extending upwardly in obtuse angular relationship to the plane of the bottom and in divergent relationship to one another, as shown in Fig. 10. Adjacent the bottom 25, the side plates 38 and 39 are substantially coextensive therewith longitudinally of the body. At their forward ends, the plates 38 and 39 extend upwardly and forwardly from the bottom in obtuse angular relationship thereto, so that the top margins of the plates project forwardly from the bottom. Along their upper margins, relatively heavy angles such as 40 are secured to the exterior surfaces of the plates 38 and 39 by means such as longitudinal welded seams, thereby to rigidify the top portions of the side walls and serve as mounting supports for outwardly open channel tracks such as 42. Vertical rigidity of the side walls is provided at spaced positions aligned with the cross member 29 and reenforcing channel 34 by channels 43 and 44 secured to the plate 38 on one side of the body and by channels 45 and 46 secured to the plate 39 on the other side of the body.

At the rear end of the body, a rear skirt 47 in the form of a relatively heavy metal plate is cut away at its upper portion to fit over the rear end margins of the bottom 25 and side plates 38 and 39 and is secured to the bottom and those side plates in substantially flush relationship to their rear edges. The upper portion of this skirt 47 slopes outwardly and downwardly from positions adjacent the angles such as 40 at the tops of the side walls and extends to a position well below the body bottom, thereby to provide a rear fender and tire shield, as well as to serve in casting material which is ejected from the rear end of the body, and if desired, to be utilized as a pusher for spreading material which has been ejected from the body or serve as a contact plate against which a pushing vehicle may operate if necessary. The lower margin 48 of the skirt 47 is bent to extend downwardly in obtuse angular relationship to the upper portion thereof, and an angle 49 is secured to the inner surface thereof to laterally rigidify the lower portion of the skirt.

Along the rear margins of the body side plates 38 and 39 and adjacent the skirt 47, channels 50 and 52 (Figs. 5 and 10) are secured to the side plates and extend downwardly from the angles such as 40 at the tops of the side walls to the laterally extending angles 49 at the lower margin of the skirt to further rigidify the skirt and the rear portion of the body. Along the lower margins of the side plates 38 and 39 and between the channels 43 and 44, relatively heavy angles 53 and 54 are secured to the exterior surfaces of the side plates 38 and 39 by welded seams to afford rigidity between the upright channels. Likewise, relatively heavy angles such as 55 are secured to the lower margins of the side plates 38 and 39 between the channels 44 and 50 at the rear portion of the body. At the forward end of the body, the side plates 38 and 39 are rigidified along their upwardly and forwardly extending margins by channels such as 56 secured to the exterior surfaces of the side plates and extending forwardly from the channels such as 43.

The gooseneck supporting and connecting structure at the forward end of the body of the disclosed vehicle is of hollow box-type section having an upper plate 57 and a lower plate 58 bent to conform to similar laterally spaced and curved side plates such as 59, said plates being secured together by welded seams. The forward end of the gooseneck is secured to a bearing element 60 which constitutes a part of the coupling structure 22.

At the rear end of the gooseneck connecting and supporting structure 17, the plates 57, 58 and 59 are secured to the midportion of a relatively large and relatively heavy lateral cross tube 62 which serves to rigidify the front end portion of the body structure and acts as a supporting truss at the front of the body. The tube 62 extends the full width of the front end of the body between the upper margins of the forward ends of the side plates 38 and 39, and is secured to those side plates, as well as to other parts of the body structure for supporting the body and its contained load during operation of the vehicle.

Considered somewhat more generally, the body bottom 25 slopes downwardly toward the front from a rear discharge lip 64 which is above and to the rear of the channel 30 from which the axles for the wheels 14 and 15 are supported. The downward slope of the body bottom toward the front serves purposes including the improvement of the ability of the body to retain a large load and the provision of a relatively high discharge lip over which material is discharged from the rear of the body in use. The downward slope of the body bottom toward the front also lowers the center of gravity of the body and its load, affords improved load distribution between the tractor wheels which drive the vehicle and the wheels which support the rear of the trailer, lowers the average loading height of the body sides and gives more tire clearance without loss of load carrying capacity, as well as providing room for a relatively large and rugged axle structure.

By encompassing the sides and bottom of the body at the rear, the skirt 47 aids in preventing a tendency of the body to spread at the rear end during the hauling of heavy loads and also tends to prevent the spreading of the rear ends of the channel tracks 42. The outward and downward slope of the skirt 47 from the rear end of the body aids in casting ejected material away from the rear of the body as it is discharged, and being reenforced for rigidity, the skirt is adapted to use as a pusher for spreading material which has been discharged from the body or as a contact plate for an assisting motivated vehicle.

In the disclosed structure, the tops of the body side plates 38 and 39 and the channel tracks 42 which are mounted on the exterior surfaces of the body side plates are in planes which are substantially parallel to the body bottom 25. Thus, the body side walls do not interfere with the movements of an ejector plate 65 longitudinally of the body in substantially parallel relationship to the body bottom, and the channel tracks 42 serve as guide rails or tracks along which the ejector plate 65 is movable.

As herein illustrated, the ejector plate 65 is a part of an ejector assembly 66, which ejector assembly also includes upwardly extending side wall extensions 67 and 68 of generally triangular shape and which, in the present instance, are substantially coextensive with the body side walls and are higher at the front than at the rear ends. The side wall extensions 67 and 68 include side plates 69 and 70, the lower margins of which, as shown in Figs. 6, 7 and 10, are formed to provide flanges such as 72 projecting outwardly of the body side walls and downwardly projecting skirts 73 which flare outwardly soemwhat toward their bottom edges. In their mounted positions, the flanges 72 and skirts 73 overlie the upper and outer side portions of the channel tracks 42 on the body side walls in spaced relationship thereto and provide a protective enclosure for vertical rollers 74, 75 and 76 and horizontal rollers 77 and 78 which engage the channel tracks 42, as shown in Figs. 6 and 7, and at positions such as those depicted in Fig. 5, to support the ejector assembly relative to the body side walls for longitudinal movement therealong. Although it may be understood that different numbers of such rollers may be used to provide satisfactory operation, the rollers are mounted near the front end of each side of the ejector assembly, so that while a pluraliy of the rollers remain in engagement with the channel tracks 42 to maintain stability of the ejector assembly relative to the body, the ejector assembly is movable longitudinally of the body between positions (as shown in Figs. 5, 8 and 9) in which the ejector plate 65 travels between the normal position at the front of the body as shown in Fig. 8, and a load ejecting position at the rear of the body, as shown in Fig. 9.

As shown in Fig. 6, each of the horizontal rollers 77 and 78 is supported by a bearing bracket 79 which carries a stud shaft 80, upon a projecting end portion 82 of which stud shaft the roller is suitably journaled for rotation in contact with the mid portion of the web 83 of the adjacent channel track 42. The horizontal rollers are journalled for normal rotational movement relative to the end portion 82 of the stud shaft, and the opposite end portions of the stud shaft 80 are eccentric with respect to one another, so that adjusted rotational movement of each stud shaft relative to its bearing support bracket 79 effects movement of the supported roller laterally of the shaft axis to effect adjusted engagement of the peripheral surface of the roller with the web of the adjacent channel track.

As shown in Fig. 7, each of the vertical rollers 74, 75 and 76 is supported by a bracket 84 secured to one of the skirts 73 on the side walls of the ejector assembly. Each such bracket carries a stud shaft 85 having a projecting portion 86 upon which the roller is suitably journaled for rotation. The vertical rollers are aligned for engagement with flange portions 87 and 88 of the channel tracks 42, with the axial position of each roller being determined by means such as shims 89 between the end of the shaft and the bracket 84. As in the instance of the horizontal rollers, the end portions of the stud shafts upon which the vertical rollers are mounted are eccentric with respect to one another, so that adjusted rotation of each stud shaft determines its alignment for engagement with a flange of the adjacent channel track. Each of the vertical rollers has a flange on its outer surface which is normally out of engagement with the edges of the adjacent flanges on the channel track.

At the rear ends of the skirts 73 on the ejector assembly, end portions 92 of those skirts are bent inwardly of the body, as shown in Fig. 4, and each such end portion has secured thereto a pin 93 which projects forwardly of the body from that end portion and is aligned for engagement in a locating socket 94 at the top of the rear end portion of each body side wall. Thus, when the ejector assembly is moved forwardly of the body, so that the ejector plate is in the load hauling position, as shown in Fig. 8, the pins 93 engage the sockets 94 in the respective body side walls and prevent the rear end portions of the side wall extensions from being spread relative to the side walls of the body during loading and hauling operations.

At the tops of the plates 69 and 70 of the side wall extensions, channels 95 and 96 are secured to the top margins of the exterior surfaces of those plates and extend longitudinally thereof to provide relatively heavy top reenforcing rails on the side wall extensions which rigidify those extensions and serve to absorb impacts which may occur during loading. At the front ends of the side wall extensions, channels 97 and 98 are secured to the outer surfaces of the front margins of the plates 69 and 70 and extend downwardly therealong to the lower portions of the skirts. At spaced positions between the ends of the side plates 69 and 70 of the side wall extensions, channels 99, 100, 102 and 103 are secured to the outer surfaces of the plates and extend vertically thereof to afford vertical rigidity to the side wall extensions intermediate the ends thereof. For additional reenforcement of both the plates and skirt portions of the side wall extensions, angles 104, 105, 106, 107, 108 and 109 are secured to the exterior surfaces of the flanges 72 and to the respective plates and extend longitudinally of the side wall extensions between the vertical reenforcing channels and between the channels 100 and 102 and the channels 95 and 96 respectively.

The ejector plate 65 is secured, as by welding, to the front end portions of the side wall extensions and has a lower portion 110 shaped to extend into the body in closely spaced relationship to the interior surfaces of the side plates 38 and 39 thereof, and in closely spaced relationship to the plate 26 of the body bottom, thereby effectively to provide an interior front wall of the body which extends upwardly to the tops of the side wall extensions. Extending laterally of the top and bottom margins of the ejector plate 65, and secured to the front or outer surface thereof, are channels 112 and 113 which provide lateral rigidity to the ejector plate. At spaced positions on opposite sides of the lateral mid portion of the ejector plate, as shown in Figs. 9 and 10, vertical reenforcing channels 114 and 115 are secured to the outer or front surface of the ejector plate and extend between the channels 112 and 113. Also, at vertically spaced positions at the vertical mid portion of the front or outer surface of the ejector plate, channels 116 and 117 are secured thereto and extend between the channels 114 and 115. In the disclosed structure, fillet plates 118 and 119 are secured in and extend across the inner corners at the junctures of the ejector plate with each of the side plates 69 and 70 of the side wall extensions.

At the top of the ejector plate, an upwardly and forwardly extending apron 120 is secured to the ejector plate and is reenforced by spaced channels such as 122 extending upwardly from the channel 112 on the forward surface of the ejector plate and secured to the front or outer surface of the apron. Formed gusset plates 124 and 125 of substantially U-shaped section and of generally triangular form are secured to the inner or rear surface of the apron along the lateral margins thereof and also to the top surfaces of the channels 95 and 96.

With the disclosed structure and arrangement of parts, the ejector plate 65 is movable, as a part of the ejector assembly, longitudinally of the body between the normal or load hauling position shown in Figs. 3 and 8 and the load ejecting position illustrated in Figs. 4 and 9. Since the rollers 74, 75 and 76, which serve vertically to guide and support the ejector assembly, move along the channel tracks 42 which are substantially parallel to the body bottom, the lower edge of the ejector plate moves along the body bottom in closely spaced relationship thereto between the load hauling and ejecting positions. Rollers 126 and 127 are rotatably mounted on pins 128 and 129 between the side portions of substantially U-shaped brackets 130 and 132 secured to the channel 113 near opposite sides of the lower edge of the ejector plate and engage the surface of the plate 26 of the body bottom, thereby to serve as guides and runners for the movements of the ejector plate.

As shown in Figs. 5 and 9, the vertical rollers 74 and 75 and the horizontal rollers 77 remain in contact with the flange and web portions of the channel tracks 42 to support the rearwardly projecting parts of the side wall extensions from the body when the ejector assembly is moved to the load ejecting position and even when the ejector plate 65 is relatively close to the rear end of the body. When the ejector assembly is in the normal load hauling position, all of the rollers engage their respective channel tracks and the vertical rollers 74 and horizontal rollers 77 engage the portions of the channel tracks which extend forwardly of the normal position of the ejector plate.

For effecting movements of the ejector assembly relative to the body in the disclosed structure in both directions, multi-stage, double-acting hydraulic rams 134 and 135 are utilized, which rams, as herein illustrated, act directly between the body and the ejector assembly on opposite sides of the body. In order to utilize the maximum available force of the rams, their longitudinal axes define a plane which is substantially parallel to the plane of the movement of the ejector assembly, and which is consequently substantially parallel to the channel tracks along which the rollers move. Furthermore, in order to avoid or counteract the normal tendency of the ejector plate to be tilted in moving against the resistance of a load during ejection, the plane of the axes of the rams extends through or slightly below the axis of load resistance which is substantially coincident with the center of gravity of a normal full load in the body. Normally, a full load in the disclosed body extends upwardly to a position somewhat as indicated in dot-and-dash lines at 136 in Fig. 8, it being understood that the side wall extensions of the ejector assembly serve to support a substantial load for hauling purposes and that the load slopes downwardly toward the rear to the discharge lip 64 at the rear of the body.

The forward ends of the rams 134 and 135 are secured through cross pins 137 and 138 respectively to supporting brackets 139 and 140 constructed of relatively heavy plate stock and secured to the opposite sides of the body at the front thereof. The rams extend rearwardly from the brackets 139 and 140 on the body side walls and their rear ends are connected through cross pins 142 and 143 to brackets 144 and 145 respectively, which latter brackets are secured to the longitudinal mid portion of the skirts 73 on the opposite sides of the ejector assembly. As shown in Fig. 6, formed plates, such as 146, are secured to the lower edges of the skirts and extend inwardly toward the body and downwardly between the body and the respective rams to serve as shields for protecting the rams from falling material.

The illustrated rams 134 and 135 each have three sections 147, 148 and 149; the section 147 being a cylinder in which the section 148 is longitudinally movable, and the section 148, in addition to serving as a piston which moves within the cylinder 148, also serves as a cylinder in which a piston on the section 149 is movable. As shown in Figs. 2 and 8, connections for the flow of hydraulic liquid for the actuation of the rams to the double-acting pistons are made through conduits 150 and 152, the former of which extends downwardly through the gooseneck structure and outwardly in both directions through the cross tube 62 to the forward ends of the section 147 of each ram. The conduit 152 is flexible and has one end anchored at 153 to the top portion of the outer surface of the ejector plate, while an extension 154 thereon connects to the rear end of the middle section 148 of each ram. This provides for actuation of the rams for moving the ejector assembly in both directions.

Although not essential to the vehicle, particularly for hauling heavy materials such as rocks and gravel, larger volumetric load hauling capacity may be provided in the disclosed trailer structure by the use of a tail gate 155, as depicted in Figs. 1 and 2. The tail gate, in this instance, is secured to the rear ends of the side wall extensions 67 and 68 and extends downwardly therefrom; the shape and size of the tail gate 155 being such that it overlaps the side plates 38 and 39 and the bottom 25 of the body so as to close the otherwise normally open rear end of the body. When the ejector assembly is in its forward or load-hauling position, the tail gate rests against the rear edges of the body side plates and bottom to effect the closure. Upon rearward movement of the ejector assembly, the tail gate moves away from the body with the ejector assembly to provide space for the ejection of the load from the body.

From the foregoing description and reference to the accompanying drawings, it may be understood that in the disclosed structure I have provided a load hauling trailer capable of hauling large and heavy loads, and from which the hauled material is ejected by the rearward movement of an ejector assembly which normally serves as a part of the load hauling body structure. The structure and arrangement of parts in the body and its ejector assembly are such that the center of gravity of the loaded vehicle is low, in order to provide stability in operation, and a major portion of the load is hauled at a forward position in the trailer body, so that there is a very satisfactory weight distribution between the driving wheels of the trailer. The disclosed trailer structure is also adapted to efficient and effective operation by hydraulic rams which act directly between the body and load ejecting assembly for effecting the ejection of the load and the return of the ejector assembly to its normal load hauling position. The body lip over which the material is discharged is relatively high, and means has been provided for the spreading or pushing of a discharged load or utilizing an assisting power operated pusher vehicle when desired. Also, the structure is adapted to the use of a tail gate, when desired, for increasing the volumetric capacity of the load hauling trailer, and such tail gate does not require any added mechanism for effecting its opening and closing during load ejecting and hauling operations.

It is understood that the foregoing description is merely illustrative of a preferred embodiment of the invention and that the scope of the invention is not to be limited thereto but is to be determined by the appended claims.

I claim:

1. In an ejector type load hauling vehicle, the combination comprising a body having a front wall, side walls and a bottom, an ejector assembly mounted on the body side walls for movements longitudinally of the body, said ejector assembly including a front wall embodying a pusher plate extending into the body in closely spaced relationship to said side walls and bottom and also upper side wall extensions extending rearwardly along the side walls from the pusher plate, a direct acting hydraulic ram on each side of the body, each of said rams having one of its ends connected to the adjacent body side wall and its other end connected to the adjacent side wall extension for effecting said longitudinal movements of the ejector assembly relative to the body, and said side wall extensions on the ejector having means thereon slidably engageable with means on the body side walls for locking and holding the rear ends of the side wall extensions in aligned relationship with the body side walls when the ejector plate is at the forward end of the body.

2. In an ejector type load hauling vehicle, the combination comprising a body open at the top and having side walls and a bottom, an ejector assembly including side portions extending upwardly from and longitudinally of the body side walls and a pusher plate extending into the body in closely spaced relationship to the side walls and bottom, said pusher plate having a normal position at the front of the body, means supporting the ejector assembly on the body for movements longitudinally thereof, and hydraulic rams acting directly upon the ejector assembly for effecting the longitudinal movements of said assembly relative to the body, and said side wall extensions on the ejector having means thereon slidably engageable with means on the body side walls for locking and holding the rear ends of the side wall extensions in aligned relationship with the body side walls when the ejector plate is at the forward end of the body.

3. An ejector type of load hauling trailer comprising, in combination, a body having side walls and a bottom, gooseneck connecting and supporting means secured to the front end of the body, wheel and axle means for supporting the rear end of the body, the bottom of the body and the tops of the side walls sloping downwardly in substantially parallel relationship to one another toward the front from a rear discharge lip rearward of and above the axle means, an ejector assembly mounted on the body side walls for movements longitudinally thereof and including an ejector plate extending into the body in closed spaced relationship to the side walls and bottom and side portions extending upwardly from and longitudinally of the body side walls, and power operated means for moving the ejector assembly relative to the body, said side portions of the ejector assembly tapering downwardly in height toward the rear so that the upper edges thereof are relatively horizontal.

4. In an ejector type load hauling vehicle, the combination comprising a body having a front wall, side walls and a bottom, an ejector assembly mounted on the body side walls for movements longitudinally of the body, said ejector assembly including a front wall embodying a pusher plate extending into the body in closely spaced relationship to said side walls and bottom and also upper side wall extensions extending rearwardly along the side walls from the pusher plate, a direct acting hydraulic ram on each side of the body, each of said rams having one of its ends connected to one end of the adjacent body side wall and its other end connected to the adjacent side wall extension adjacent the longitudinal mid-portion of the body for effecting said longitudinal movements of the ejector assembly relative to the body, said upper side wall extensions being substantially coextensive longitudinally of the vehicle with the body side walls, and a closure plate secured to the rear end of the side wall extensions and movable therewith, said closure plate being of a size to extend downwardly over the rear ends of the body side walls and bottom.

5. In a ejector type load hauling vehicle, the combination comprising a body open at the top and having side walls and a bottom, an ejector assembly including side portions extending upwardly from and longitudinally of the body side walls and a pusher plate extending into the body in closely spaced relationship to the side walls and bottom, said pusher plate having a normal position at the front of the body, means supporting the ejector assembly on the body for movements longitudinally thereof, double acting plural sectional hydraulic rams extending longitudinally of the body side walls and acting directly upon the longitudinal mid-portion of the lower edge of the ejector assembly for effecting the longitudinal movements of that assembly relative to the body, and said side portions of the ejector assembly normally extending from the front to the rear end of the body and having a closure plate secured thereto and extending downwardly therefrom to provide a tail gate for closing the rear end of the body for hauling.

References Cited in the file of this patent

UNITED STATES PATENTS

| | | |
|---|---|---|
| 1,300,111 | Billings | Apr. 8, 1919 |
| 2,047,602 | Tomlinson | July 14, 1936 |
| 2,179,726 | Lewis et al. | Nov. 14, 1939 |
| 2,590,355 | Turner et al. | Mar. 25, 1952 |
| 2,751,096 | Darkenwald | June 19, 1956 |
| 2,788,737 | Link | Apr. 16, 1957 |
| 2,795,872 | Wardle | June 18, 1957 |
| 2,800,234 | Herpich | July 23, 1957 |